Oct. 14, 1924.
C. BIRDSEYE
1,511,824
METHOD OF PRESERVING PISCATORIAL PRODUCTS
Filed April 18, 1924   2 Sheets-Sheet 1
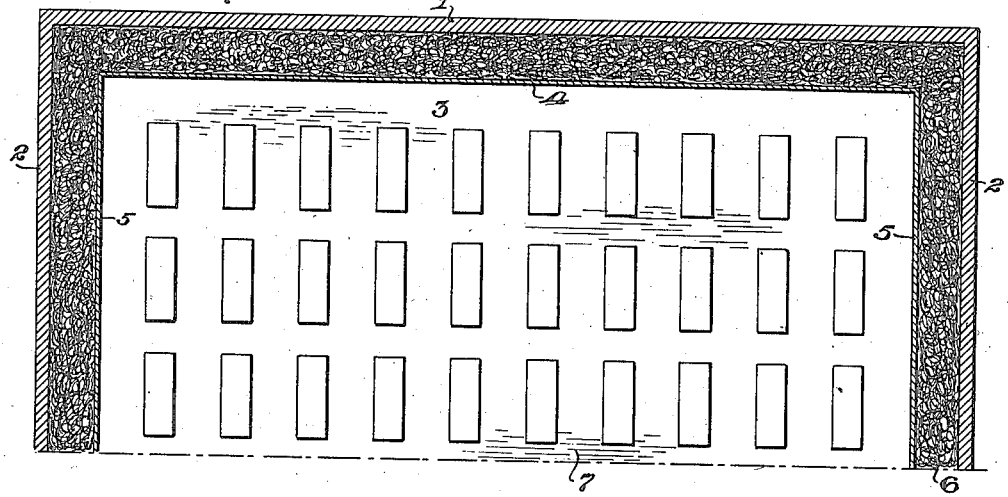
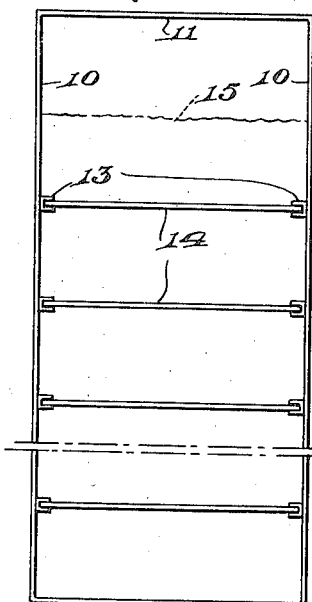
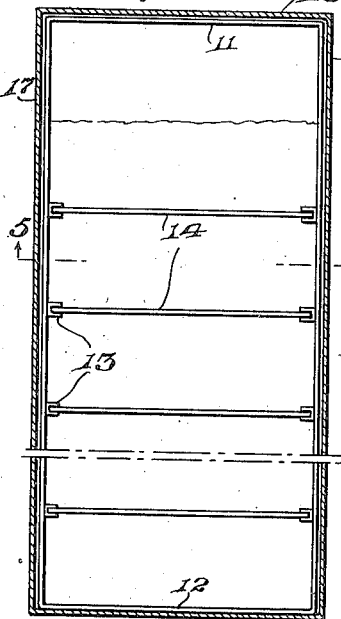
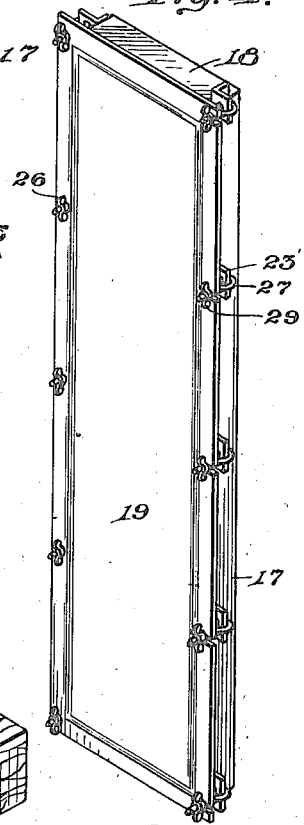
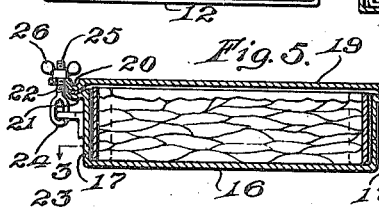
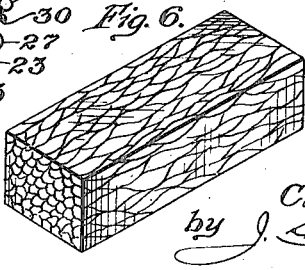
Inventor,
Clarence Birdseye,
by J. Stuart Freeman,
Attorney.

Oct. 14, 1924.  
C. BIRDSEYE  
1,511,824  
METHOD OF PRESERVING PISCATORIAL PRODUCTS  
Filed April 18, 1924   2 Sheets-Sheet 2
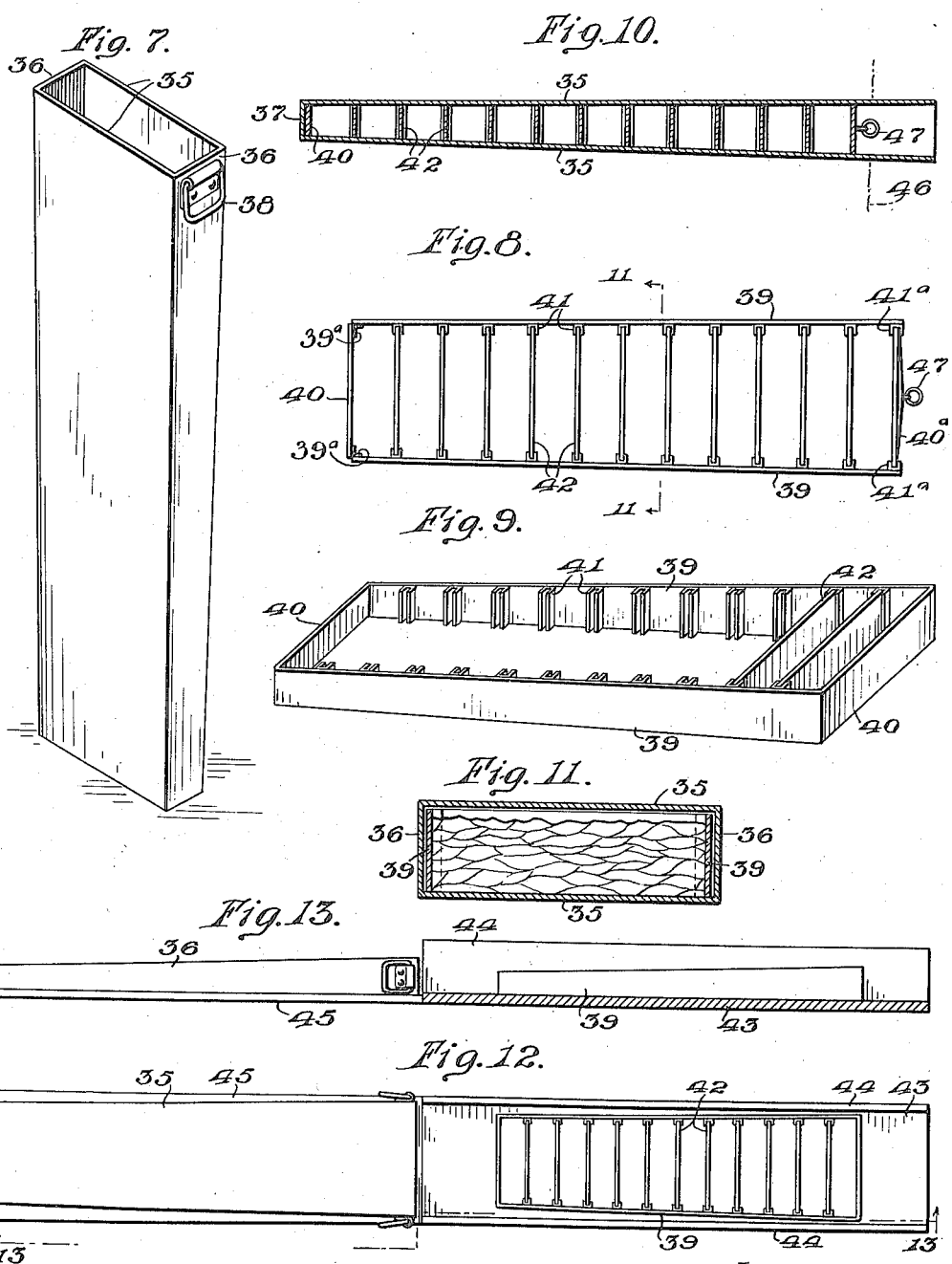
Inventor,
Clarence Birdseye,
by J. Stuart Freeman,
Attorney.

Patented Oct. 14, 1924.

1,511,824

UNITED STATES PATENT OFFICE.

CLARENCE BIRDSEYE, OF YORKTOWN HEIGHTS, NEW YORK.

METHOD OF PRESERVING PISCATORIAL PRODUCTS.

Application filed April 18, 1924. Serial No. 707,407.

*To all whom it may concern:*

Be it known that I, CLARENCE BIRDSEYE, a citizen of the United States, residing at Yorktown Heights, in the county of Westchester and State of New York, have invented certain new and useful Improvements in Methods of Preserving Piscatorial Products, of which the following is a specification.

The object of this invention is to provide an improved process for the preservation of fish and sea-foods in general, as well as any other substances that answer to the same treatment.

Another object resides in the provisions of improved apparatus, which has been designed for the particular purpose of carrying out the process above referred to in a most efficient and economical manner.

It is well known that fish like many other dietary articles has been frozen for the purpose of suspending, or preventing, decomposition through oxidation, bacteriological or other action, but the present invention goes much further than that and accomplishes results heretofore unknown in the seafood industry.

Also, there are phases of the subject that may not appear at a casual glance, yet which are most important both from the standpoint of the consumer on the one hand and the manufacturer and dealer on the other. Of great importance is the fact that the ability to freeze fish, without in any way adversely affecting it as an article of food, makes it possible to supply this highly desired commodity to inland points far removed from the greater rivers and the oceans where the fish is caught, to ship particular varieties of seafood from a relatively restricted locality that is its natural habitat throughout a radius of land and sea many thousands of miles in extent, and furthermore to hold such foods from periods of plentiful production to times of relative scarcity.

However, there are commercial drawbacks to the mere freezing of fish as they are met with in the general run, as the very nature of the same with their infinite number of sizes and shapes makes them difficult to handle and to ship economically. Fish merely frozen, regardless of the amount of care used, and then packed in a barrel, box, or other container, with or without the heads and tails, (or first packed and then frozen) include in their bulk a honeycomb of air pockets which being heat-insulating in character constitute a hindrance to the thorough and uniform freezing process, and furthermore supply oxygen at once to bacteria and germ colonies immediately upon the temperature becoming right for their propagation.

Therefore, another object of this invention is to provide apparatus, not alone for freezing the fish, but for preparing the same in suitably formed masses or blocks, which will be free from the air pockets above referred to, and which can be wrapped by automatic machinery, and thereafter so packed for shipment that the undesirable air-filled spaces between the adjacent packages will continue to be eliminated.

Aside from the foregoing brief mention of the broad aspect of the invention, there are numerous details relating to the construction and operation of the apparatus, and to the process and the method by which it is carried out, all of which are hereinafter fully described, when read in conjunction with the accompanying drawings, in which Fig. 1 is a schematic view of a portion of a refrigerating tank; Fig. 2 is a plan view of one type of frame which may be used; Fig. 3 is a similar view of said frame positioned within a surrounding container; Fig. 4 is a perspective view of one embodiment of such container; Fig. 5 is a vertical transverse view of said container, together with a form positioned therein, and said container and form being in the position occupied when being filled; Fig. 6 is a perspective view of a block representing a frozen block of fish after being removed from said form; Fig. 7 is a perspective view of another type of container which may be used in the freezing of the fish contents; Fig. 8 is a top plan view of a frame particularly adapted for use with this latter type of container; Fig. 9 is a perspective view of the frame in ways similar to that shown in Fig. 8; Fig 10 is a longitudinal transverse section of the container of Fig. 7, with the frame of Figs. 8 or 9 operatively positioned therein, but, for convenience, shown in a horizontal position, instead of upright as when immersed in the freezing liquid;

Fig. 11 is a section on the line 11—11 of Fig. 8; Fig. 12 is a plan view of said frame filled with fish resting upon a suitable table or platform, and with the container positioned adjacent thereto ready to receive said frame and its contents; and Fig. 13 is a part elevation of the elements shown in Fig. 12, and taken from the line 13—13 of said Fig. 12.

Referring to Fig. 1, there is shown a portion of a refrigerating tank, having side and end walls 1 and 2, while positioned within said tank and spaced from the inner surfaces of said walls is a water-tight lining having a bottom 3 and side and end walls 4 and 5, respectively. The space between the walls of the tank and its lining is filled with any suitable heat-insulating material 6, while within said lining there is the liquid 7 employed as a refrigerating medium. This liquid, for a purpose hereinafter described, is preferably composed of calcium chloride brine, and in this brine or other suitable refrigerating medium the containers hereinafter described are stood on end or suspended by any suitable means.

Referring to Fig. 2, there is shown a frame which is preferably rectangular and of uniform width from top to bottom, said frame comprising side walls 10 and top and bottom walls 11 and 12, respectively. At spaced intervals upon the inner surface of said side walls are provided channel-irons 13 or such other arrangement of oppositely positioned grooves, or of angle-irons as will provide between them channels, there being inserted vertically in said channels independently removable partitions 14 of any suitable material and either rigid or relatively flexible, it being understood that instead of a partition being inserted for each pair of oppositely positioned channels, certain of said partitions may be omitted. The reason for this resides in the fact that the contents of said frame between two adjacent partitions, when all of the latter are in place, provides a mass of fish or the like having a given weight, as for instance two pounds.

Consequently, by omitting alternate partitions, masses of fish or the like will be provided having double the said weight, or four pounds each. It is also to be noted that a greater space than that of vertically adjacent channels is provided between the uppermost pair of channels and the top wall 11 of said frame, which arrangement is provided that a portion of one end of the respective containers and their inclosed frames project above the upper surface of the refrigerant liquid 7, which at once explains why the frames are not fully up to the said top wall 11, but instead only to the uppermost of the partitions 14, or, at most, to the level indicated at 15.

Referring to Figs. 3 to 5 inclusive, a container is provided, which, when in horizontal position, comprises a bottom wall 16, side walls 17, and end walls 18. A substantially plane top 19 is provided, the same having means about its periphery for maintaining water-tight connection between said top and the side and end walls 17 and 18. To accomplish this purpose, said top preferably extends laterally beyond said side and end walls and is provided with a marginal depressed groove, which provides upon the undersurface of said top or lid a continuous ridge or beading 20. The side and end walls in turn are flared laterally outwardly and convexly curved upon their upper surfaces to provide flanges 21, into which the beading of the lid enters, there being positioned, however, between said beading and flange any suitable type of gasket 22 for insuring a water-tight connection.

Special hinges and clamps are provided for permitting the said lid to be loosened outwardly from the remaining portions of the container, and thereafter tilted reversely while said container is being filled. A hinge which will fulfill the desired object comprises a suitable bracket 23 secured to the outer surface of one of the walls 17, and provided with an aperture through which extends an elongated hinge 24, having an integral threaded projection 25 extending through an aperture in the flange of the lid outside of said beading, there being a thumb-nut 26 provided for said threaded projection.

To the outer surface of the opposite wall 17 is secured another of said brackets 23, while through an aperture of the latter passes a hinge 27, which need not be elongated as the hinge 24, though from its side there also extends a threaded projection 28 carrying a thumb-nut 29, said projection passing upwardly through a transversely extending slot 30 in the lid flange opposite to that above referred to. With this construction, and the lid securely positioned with respect to the body portion of the container, the nuts 26 and 29 may be loosened, and the hinge member 27—28 rotated laterally outwardly upon its supporting bracket 23, thereupon permitting the lid 19 to be raised and swung reversely into inverted position by means of the connection between the link member 24—25 and its supporting bracket 23.

To close the container, this operation is reversed until the lid is firmly seated with the beading and flanges aligned, the gasket positioned therebetween, after which the clamp member 27—28 is again rotated into the slot 30 and the nuts 26 and 29 tightened. However, it must be understood that the present invention does not depend upon this particular construction and arrangement of container body, and cover, but broadly permits the use of any other form suitable for the purpose.

By referring to Fig. 4, it will be noted that as many of said clamps and hinges as are desired may be provided. In the operation of this type of container and frame, the former is laid in horizontal position as indicated in Fig. 5, and the frame placed therein as shown in Fig. 3, with as many of the partitions 14 in place as are desired to form fish-blocks or cakes of predetermined size as hereinbefore explained. The fish is dressed ready for the pan, that is, ready to be cooked, preferably in the form of fillets, steaks, or pan fish.

This dressed fish is packed closely in the several compartments of the frame as it lies within the container, it being preferable not to fill each compartment to the very top, but as indicated in Fig. 5, so that when the container is stood upon end and immersed within the refrigerating liquid in this position, the fish fillets settling to the bottom of each compartment, that is, resting upon the partition, or lower wall 12, next below each mass of fish, leaves an air space at the top of each mass, so as to allow sufficient room for expansion during freezing.

It is also highly preferable to bring about the freezing of the fish in the shortest possible time, in order that as has been proved by extensive experiments, and as is recognized in actual commercial practice, the fish will retain its original fresh appearance in color, shape, and also its original texture, with the result that fish rapidly frozen and even kept for months or possibly years when cooked is indistinguishable from fish of the same kind which has been freshly caught, cooked and served without having been previously frozen.

The contents of the container and frame having been frozen, the containers are removed from the refrigerating liquid, the covers removed, and the frame with the fish-blocks as represented in Figs. 2 and 6 removed therefrom. These blocks are then removed from the frame and being of uniform size, shape and weight may be fed into any suitable type of automatic wrapping-machine and covered with so-called vegetable, parchment, or wax wrapping paper, thereafter being packed in any desired quantity for temporary storage in a refrigerator or immediately into shipping cartons, as those described in copending application Serial No. 592,938, said cartons if desired being previously chilled, and which cartons, by virtue of their heat-resisting walls, operate to maintain fish at a low temperature while it is being shipped over land or sea for several thousand miles.

Referring now to Figs. 7 to 13 inclusive, a simpler form of container is provided, the same comprising downwardly converging side walls 35 and end walls 36, and being closed at the bottom 37, while suitable handles 38 are provided for lifting the container from the refrigerating liquid in any suitable tank or receptacle, such for instances as that shown in Fig. 1. It should be understood that the tapering of the walls of this container is exaggerated in the drawings for the purpose of illustration.

A frame is provided, the same having side walls 39 preferably hinged at 39ª to an end wall 40, while along the inner surfaces of the side walls are oppositely positioned pairs of channel-irons 41, into which slidably removable partitions 42 of any desired rigid or flexible material are inserted, in number and position as may be desired. Between the free ends of the side walls a removable rigid closure member 40ª is inserted in the oppositely positioned end grooves 41ª. In operation, this frame is laid upon a suitable supporting table or platform 43, which may if desired have oppositely positioned upright side walls 44, which cooperate with the platform to guide the frame and contents into the container, which rests upon the platform or support 45 in alignment with the table 43, thereby making it possible for the frame to be shoved directly into the position indicated in Figs. 10 and 11, and then raised into the position shown in Fig. 7 for immersion in the refrigerating liquid, which of course reaches substantially only to the dot-and-dash line 46 upon the container as illustrated in Fig. 10, but understanding that the same in practice is in upright position, and that the said dot-and-dash line represents the horizontal level of the liquid.

After the freezing of the contents, the individual containers are removed from the liquid and water run over their outer surfaces, as is usual in ice-making, after which the frame and its solidly frozen contents may be withdrawn from the container by means of any suitable type of handle 47 or other suitable means, and the container and contents dumped, or otherwise removed therefrom, after the container is lowered into the position shown in Figs. 12 and 13. The solid blocks of frozen fish being then removed from this form or frame are of so nearly the same size that they too may be fed into an automatic wrapping-machine as described in connection with the first type of frame and container. However, instead of being wrapped at once, these blocks, it should be understood, need not be as small as the unit quantity between each pair of adjacent partitions, but under certain conditions, as when they are to be stored, or shipped in bulk, the entire contents of a frame (or any fractional part thereof), including a plurality of the said units, may be maintained intact, to be separated into units and wrapped or boxed at any later time.

Having thus described my invention, what I claim and desire to protect by Letters Patent of the United States is:—

1. The process, which consists in cleaning, and dressing fish ready to cook, packing it in forms to provide independent units, immersing said forms in a refrigerating medium to solidify said units, withdrawing said forms from said medium after their contents have become frozen, removing said frozen units as individual blocks, wrapping said blocks, and packing said blocks in heat-insulated containers for shipping.

2. The process, which consists in cleaning, and dressing fish ready to cook, to provide pieces of entirely select meat without waste, packing the fish solidly in a form having a predetermined shape, immersing said form and contents in a freezing medium to freeze and solidify said contents, removing said frozen fish from said form as a block, and wrapping said block for shipment in a suitable container.

3. The process, which consists in cleaning and dressing fish, to provide pieces of entirely edible substance without waste ready to cook, assembling said pieces to form a solid unit with a minimum of air trapped between adjacent pieces, freezing said unit to form a block capable of maintaining its shape, and wrapping said frozen block of fish for marketing.

4. The process, which consists in cleaning, and dressing, fish, to provide pieces of entirely edible substance without waste and ready to cook, assembling said pieces to form a solid mass with a minimum of air trapped between adjacent pieces, freezing said mass to form a block capable of maintaining its shape, wrapping said frozen block of fish for marketing, and then packing a quantity of such blocks in a heat-insulated container for shipment.

In testimony whereof I have affixed my signature.

CLARENCE BIRDSEYE.